Feb. 17, 1970
C. DEL VECCHIO
3,495,898
MAKEUP EYEGLASSES
Filed March 23, 1967
2 Sheets-Sheet 1
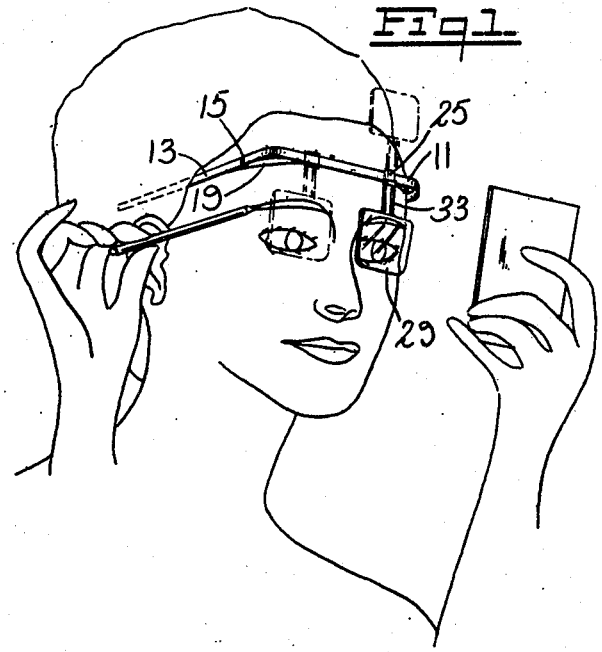
Fig 1.
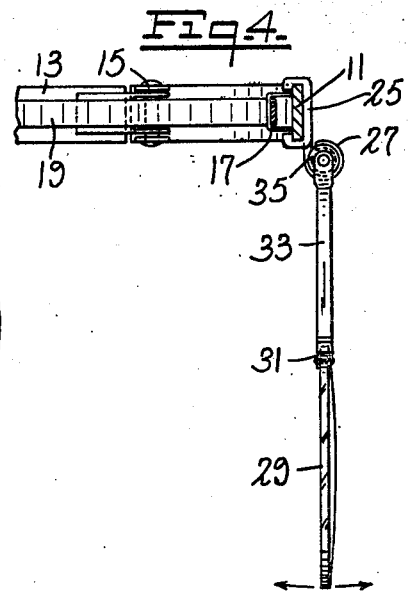
Fig 4.
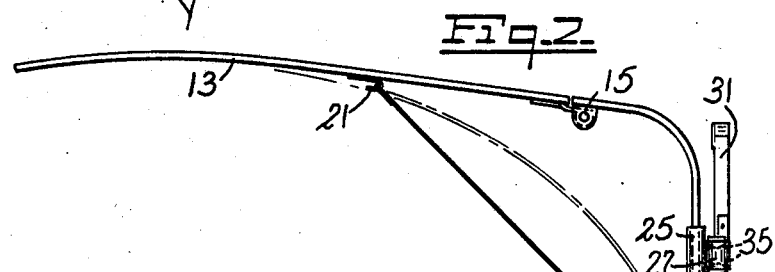
Fig 2.
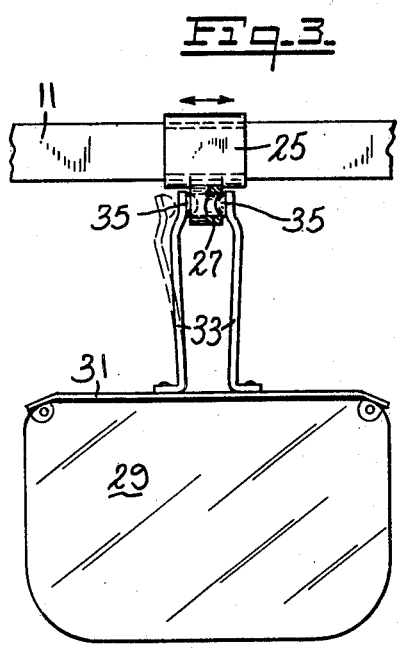
Fig 3.
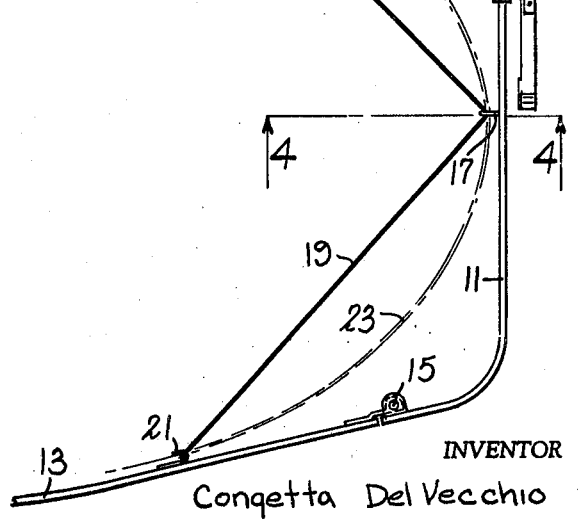
INVENTOR
Conqetta Del Vecchio
BY DeLio and Montgomery
ATTORNEYS Feb. 17, 1970     C. DEL VECCHIO     3,495,898
MAKEUP EYEGLASSES
Filed March 23, 1967     2 Sheets-Sheet 2
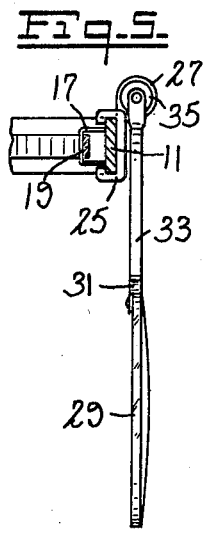
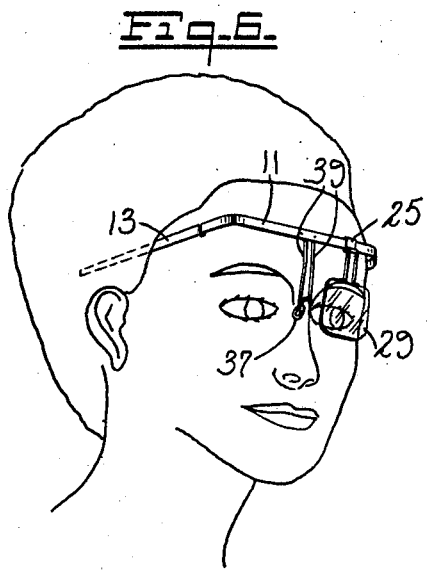
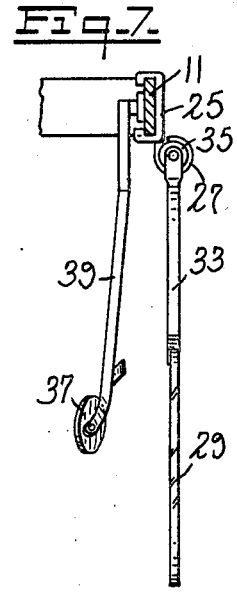
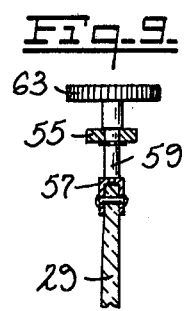
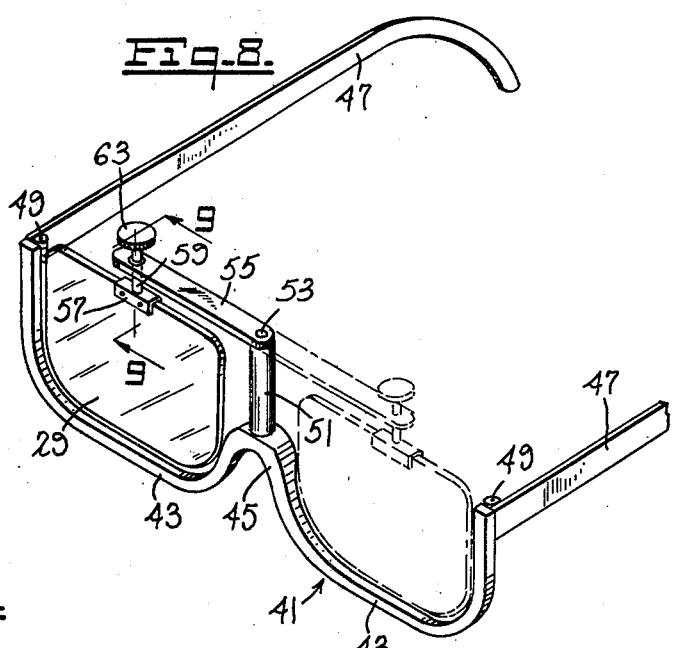
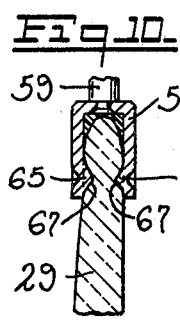
INVENTOR
Conqetta Del Vecchio
BY DeLio and Montgomery
ATTORNEYS United States Patent Office 3,495,898
Patented Feb. 17, 1970

3,495,898
MAKEUP EYEGLASSES
Congetta Del Vecchio, 11 Lillian Terrace,
Darien, Conn. 06820
Filed Mar. 23, 1967, Ser. No. 625,427
Int. Cl. G02c 1/04, 3/02, 5/04
U.S. Cl. 351—41
2 Claims

ABSTRACT OF THE DISCLOSURE

This invention is directed to eyeglasses for use while applying makeup by persons with a sight defect, which device is worn approximately in the same fashion as regular eyeglasses but which contains a lens which is both pivotable and slidable into and out of the path of vision of each eye of the user.

---

This invention relates to eyeglasses and more particularly eyeglasses for use in assisting one in the application of cosmetics to the area of the face around the eyes.

In the prior art there are many devices which have come into widespread use of late in keeping with the recent fashions concerning makeup to the eyes and to the area of the face around the eyes. As a result, various facial cosmetic makeup, mascara and other eye makeup cosmetics are being employed on a widespread basis. One problem that arises in connection with the use of cosmetic makeup around the eyes involves women and men who are farsighted, extremely near sighted, etc. They must be able to look into a mirror and effect desired makeup of the eyes, eyebrows, etc., and the use of the usual eyeglasses is not at all possible. The frame or the lenses of the eyeglass gets in the way and little if any makeup can be applied to the eyes or the area immediately around the eyes.

In view of the foregoing I have developed eyeglasses which are specifically designed for facilitating the makeup of the area arounnd the eyes by persons with sight defects. The lenses therefore can be concave, convex, etc.

In view of the foregoing an object of my invention is to provide an eyeglass frame which will facilitate the application of cosmetics to the area of the face around the eyes.

Another object of my invention is to provide an eyeglass frame with an interchangeable lens arrangement so that one eye may be used for viewing through the lens while the other eye is being made up.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings in which:

FIG. 1 is a view in perspective showing the cosmetic eyeglasses according to a preferred embodiment of my invention;

FIG. 2 is an enlarged top view of the eyeglasses shown in FIG. 1;

FIG. 3 is an enlarged front elevational view of a portion of the eyeglasses;

FIG. 4 is a sectional view taken along lines 4—4 of FIG. 2;

FIG. 5 is a sectional view similar to FIG. 4 showing the frame upside down;

FIG. 6 is a perspective view of a modified embodiment of the eyeglasses shown in FIG. 1;

FIG. 7 is a partial sectional view of the eyeglasses of FIG. 6;

FIG. 8 is a perspective view of still another embodiment of my cosmetic eyeglasses;

FIG. 9 is a partial sectional view taken along line 9—9 of FIG. 8; and

FIG. 10 is a partial sectional view of an alternate arrangement for securing the lens.

Referring now to FIGS. 1 and 3, the cosmetic eyeglasses according to a preferred embodiment of my invention, comprises a body member 11, to which are attached a pair of temple members 13. The temple members 13 are swivelably attached to the body member 11 by means of a conventional hinge arrangement generally shown at 15. The body member 11 is provided with an eye 17 which engages an elastic or resilient band 19, which band at its ends engages a pair of hooks 21 which are spaced a distinct distance from the hinge 15. In this manner the elastic band 19 will be in tension when the temple members are in place on the head of the user. The elastic band is preferably covered with a cloth and it engages the forehead of the user along a path 23 as shown by the dotted line position in FIG. 2. In this manner the elastic band 19 helps support the eyeglasses while forcing the temple members into engagement against the temples of the user.

Referring now to FIGS. 3 and 4, the body member 11 carries a channel member 25 which is slidably attached thereto along the length of the body member. This C-shaped member is preferably provided with a depending portion 27 which is preferably formed as an integral part of the channel member 25. The depending portion 27 can take many forms, although in the preferred embodiment it is essentially cylindrical in shape and hollow. It can be a solid member with concavities, etc. A suitable lens 29 is attached to and held in a lens frame 31 which in turn is attached to a pair of resilient legs 33. These legs are provided with contact points 35 which conform to the shape of the hollow or concavities in the depending portion. In this manner the lens 29 may be interchanged with other lenses as the user's eyesight changes.

Referring now to FIG. 5, which is a view similar to FIG. 4, the cosmetic eyeglass has been turned upside down so that the depending portion 27 is above the channel member. This allows for additional vertical adjustment of the lens over the eye of the user so as to bring the center of the lens in substantial axial alignment with the lens of the eye.

In FIGS. 6 and 7 there is shown a modification of the principal embodiment of my invention. In this embodiment the elastic or resilient band is eliminated and in its place are provided nose support pieces 37 which are attached to the body member 11 by means of legs 39. The lens 29 is supported as previously indicated in connection with FIGS. 3 and 4 and is slidably positioned along the length of the body member by means of the shaped channel member 25.

As such, when it is desired to apply makeup to a person's eyes or face, the user may slidably place the lens 29 over one eye and make up the other eye without any obstruction over the other eye. When the individual has finished making up the eye, the lens may be slidably placed over the madeup eye and the other eye attended to accordingly. Depending upon the height of the person's forehead and the placement of the eyes relative thereto the user may employ the frame right side up or upside down in order to position the center of the lens approximately in alignment with the axis of the lens of the eye. As can be seen, the invention, according to the preferred embodiments of my invention, allows for adjustability of the lens vertically and horizontally and provides a cosmetic eyeglass which facilitates the application of cosmetics to the area of the face around the eyes.

Referring now to FIG. 8, there is shown still another embodiment of my invention. In this embodiment the cosmetic eyeglass utilizes a more conventional frame 41, which comprises a pair of U-shaped members 43 which are attached to and formed as an integral part of a nose rest 45. At the end opposite the nose rest the U-shaped members terminate and temple pieces 47 are swivelably attached to the U-shaped members by means of a hinge arrangement 49. At the top of the nose rest 45 there is provided an upstanding member 51. This member engages a pin or shaft 53 attached to or formed as an integral part of a swivel arm 55 which can be rotated from the solid line to the dotted line position as shown in FIG. 8.

Referring now to FIG. 9 the lens 29 is attached to a lens clamp 57. In turn, the lens clamp is attached to or forms an integral part of a rotatable shaft 59 which is secured to the swivel arm 55 by spring fastener or the like, 61, and by a thumb member 63.

In use, the eyeglasses shown in FIG. 8 are placed on the lower portion of the nose of the user so as to afford maximum clearance for makeup of that portion of the face around the lower portion of the eyes. The temple pieces help to hold the frame secure on the head of the user and the lens is swivelably movable into position over one eye and then the other. In this embodiment the lens 29 preferably is swivelably engaged in the swivel arm 55 so that the same surface of the lens is brought into position over the lens of the eye.

Referring now to FIG. 10 there is shown an alternate arrangement for securing the lens 29 to the lens clamp 57. In this embodiment the lens clamp 57 is crimped at 65 so as to conform to the circumferential indentation 67 in the lens 29. Cement 69, with or without filler material, is provided in the lens clamp so as to hold the lens securely in place.

It will thus be seen that the objects set forth above, among those made apparent from the preceding description, are efficiently attained and, since certain changes may be made in the above article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Cosmetic eyeglasses for use by persons with a sight defect to apply makeup, comprising a body member, temple portions swivelably attached thereto, a resilient elastic band attached to said body member and positioned within the confines of the body member and temple portions engaging the forehead of the person, a lens, pivotable and slidable means for connecting said lens to said body member, including a channel member slidably mounted on said body member such that said lens can be slidably moved to any position on said body member permitting said lens to be movable into and out of position over each eye of the person for facilitating the application of cosmetic makeup to the eye.

2. The eyeglasses of claim 1, further defined in that said pivotable and slidable means for connecting said lens includes a ball and socket means for detachably mounting said lens and permitting its pivoting about a horizontal axis.

References Cited

UNITED STATES PATENTS

| | | | |
|---|---|---|---|
| 104,216 | 6/1870 | Sickels | 351—156 |
| 2,545,673 | 3/1951 | Pozarik | 351—59 |

FOREIGN PATENTS

| | | |
|---|---|---|
| 413,556 | 5/1910 | France. |
| 766,112 | 4/1934 | France. |
| 1,266,652 | 6/1961 | France. |

DAVID SCHONBERG, Primary Examiner

R. L. SHERMAN, Assistant Examiner

U.S. Cl. X.R.

351—59, 60, 123, 124